Nov. 16, 1943.     S. K. WOOD     2,334,466
LICENSE PLATE
Filed Nov. 26, 1941
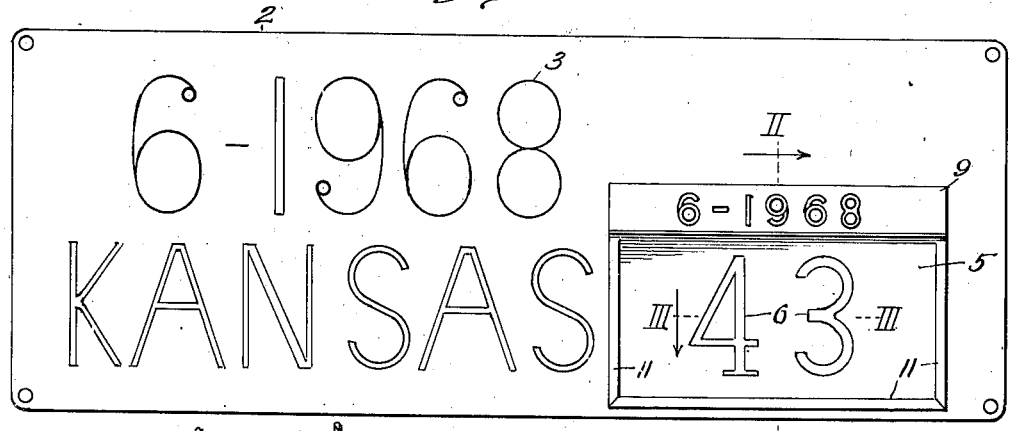
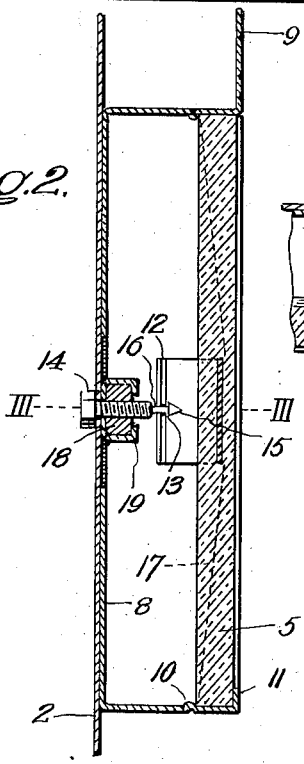
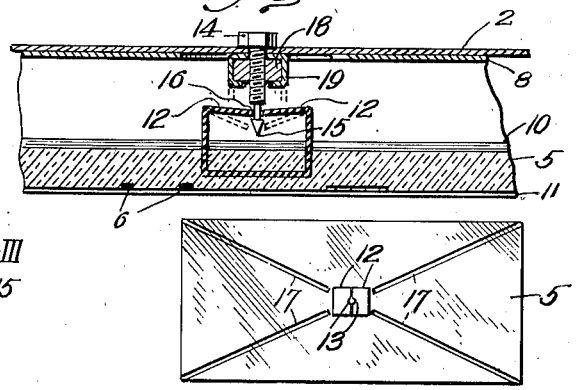
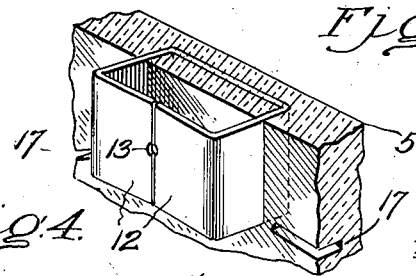
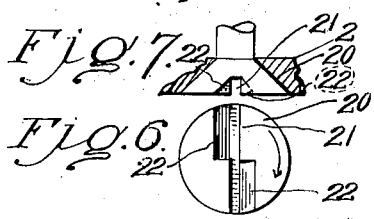
Inventor
Straud K. Wood
By Thorpe & Thorpe
Attorneys Patented Nov. 16, 1943

2,334,466

UNITED STATES PATENT OFFICE 2,334,466

LICENSE PLATE

Straud K. Wood, Hutchinson, Kans.

Application November 26, 1941, Serial No. 420,486

6 Claims. (Cl. 40—125)

This invention relates to automobile license plates and has for its general object to provide a plate bearing a number or other indicia to be permanently assigned to a determined car or car owner, but having a display element for annual or other periodical replacement as license or tax fees are paid.

A further object of the invention is to provide means of the general character mentioned which cannot be removed from association with the license plate for which it is intended without causing the breaking or fracture of the display element.

With the general objects named in view and others as will hereinafter appear, the invention consists in certain novel and useful features of construction and organization of parts as hereinafter described and claimed; and in order that it may be fully understood, reference is to be had to the accompanying drawing, in which—

Figure 1 is a face view of a motor car license plate embodying the invention.

Figure 2 is an enlarged vertical section on the line II—II of Figure 1.

Figure 3 is a horizontal section on the line III—III of Figure 2.

Figure 4 is a detail perspective view of a locking element for the frangible year tag display element of the license plate.

Figure 5 is a rear view of the frangible year tag.

Figure 6 is a face view of a one-way clamping screw which may be used if desired.

Figure 7 is a side view of the screw shown in Figure 6.

In the said drawing, where like reference characters identify corresponding parts in all of the figures, 2 is a license plate bearing identifying numbers or the like 3. In the preferred arrangement, a particular license plate is assigned to a determined car or individual owner, for use over a number of years or tax periods. Instead of securing a new number or new license plate each year, the owner merely receives a display element indicating an additional year or period for which tax has been paid. In order to carry out such an arrangement, it will be evident the permanent license plate must be provided with replaceable or periodically renewable display indicia to correspond with the year for which license fee has been paid.

In the construction herein disclosed, a glass plate or a frangible display element 5 of rectangular form is cast or molded with numbers 6 indicating an annual or other tax period. If desired, the display element 5 may be colored to also indicate the year, and the molded numbers 6, by preference, are filled with opaque paint to make them stand out from the balance of the emblem.

This frangible element 5 is secured within a small metal casing open at its front side and having a back wall 8, an upstanding flange 9, and bottom, top and side walls projecting forward from the back wall, and pressed out to provide a backing bead 10, for the display element within the casing and closing the open front side, the front ends of the bottom and side walls having flanges 11, which define said opening and fit against the front side of the element 5, and cooperate with the backing bead in securely holding said element in position. To discourage those who might be tempted to transfer the annual display member from a licensed to an unlicensed car by bending out the edge flanges 11 to remove the glass, it is preferred to provide the glass with an inside lock so that it cannot be removed from the casing, nor the casing removed from the license plate, without first causing the breaking of the glass display element.

Therefore, the frangible element 5 is molded or cast integral with a strap terminating in a pair of projecting spring fingers 12, which are formed with coacting edge notches 13 and are so proportioned that they may be flexed as will hereinafter appear, for entrance of a locking member through the notches 13, but will then snap into locked position and will be non-yielding when an effort is made to withdraw the locking member or screw. Such a headed locking screw or bolt is shown at 14 for securing the casing to the license plate, said screw having a spear or conical point 15 at the front end for entering the spring finger opening formed by the notches 13 and forcing the spring fingers 12 to flex until the fingers ride off the rear end of the spear point and snap into a circumferential locking groove 16 near the end of the bolt. If an effort is made to withdraw the bolt from the interlocking engagement with the fingers 12, the fingers are so proportioned that they bind on the bolt back of its spear head or point and the withdrawing pressure is transmitted to the frangible element 5 to cause the shattering of the same along lines of weakening 17 which may be made in said element, if it is fairly thick.

In order to attach the casing to the license plate 2, the operator makes a hole in the license plate and inserts the locking bolt 14 which is screw-threaded through a clamping nut 18 held to the inner face of the casing 8 by a series of securing fingers 19 bent out of the wall of the casing, as shown. This bolt 14 is screwed home to clamp the casing to the license plate, through pressure oppositely applied by the head of the bolt and the nut. When the bolt is finally tightened it is interlocked with the spring fingers 12 as above described. It will be evident that with this construction, the frangible plate cannot be removed from the casing, nor can the casing be removed from the license plate, without first breaking the plate 5 to give access to the interior of the casing. As shown, the nut 18, of angular contour with opposite edges fitting flatly against the fingers 19 of the casing, is prevented from turning in either direction when the bolt is turned.

If desired, the clamping bolt 14 instead of having the large polygonal clamping head shown in Figures 1 through 5, may be provided with a flat screw head 20 for fitting in a countersink in the license plate. With this type of construction, it is preferred to form the bolt head 20 with a screw driver slot or half kerf 21 for driving it home, the other half of the slot having ratchet or sloping faces 22 so the screw cannot be removed. Of course, in both types, any suitable means may be utilized to prevent the casing from rotating in relation to the license plate as by having interlocking protuberances and sockets. As shown, the nut 18, of conventional square or hexagonal form and engaged by fingers 19, guard against rotation of the casing.

In some cases it may be desirable to mark the casing with the same numbers as borne by the license plate so that an officer can check the two against the license records for a particular car. If this is done, the upstanding flange 9 of the casing may be stamped by the license office at the time the annual fee is paid by the owner.

From the above description it will be apparent that I have produced a construction embodying all of the features of advantage set forth as desirable, and while I have described and illustrated the preferred embodiment, it is to be understood that I reserve the right to all changes within the spirit and scope of the appended claims.

I claim:

1. The combination of a support, a frangible element for display in relation to said support, a casing carrying the frangible element, and means advancible through the support and into the casing to clamp the latter to the former, said means being interlocked with the frangible element against recession.

2. The combination of a support, a frangible element for display in relation to said support, a casing carrying the frangible element, and a bolt extending through the support and into threaded relation with the casing and clamping the latter to the former, said bolt when in clamped position interlocked with the frangible element against recession.

3. The combination of a support, a frangible element for display in relation to said support, spring fingers integral with the frangible element and yieldable in one direction but non-yielding in the opposite direction, a casing carrying the frangible element and enclosing said spring fingers, and a bolt extending through the support into and in threaded relation with the casing for clamping the latter to the former and flexing the yielding fingers to lock the bolt against recession.

4. The combination with an automobile license plate, a casing secured to said plate and provided with a front opening, and a frangible license-period identifying element secured immovably within and closing the opening of the casing, of members respectively connected to the license plate and frangible element and interlocked together, one of said members lying wholly within the casing and the other adjustable from outside the casing to effect the interlocking relation within the casing, to the other member, and capable of reverse adjustment to apply force on the last-named member to effect rupture or breakage of the frangible member.

5. The combination with an automobile license plate, a casing with its back wall secured to the face of said plate, and a display license-period indicating element secured in the casing forward of and spaced from the back wall of the latter, of two interlocked members secured respectively to said plate and element, one of said members extending through the license plate and the back wall of the casing toward but terminating short of said element, and the other member projecting rearward from said element; the first-named member being accessible from the rear side of said plate for adjustment to effect the interlocking of said member with the other member or to apply force on the latter to effect the rupture of said element; the casing in conjunction with said element holding the interlocked portions of said members completely enclosed.

6. The combination with an automobile license plate and a display license-period indicating element, of an open-front casing secured against the front face of the license plate and holding the said element as a closure for the open front of the casing, spaced angular fingers projecting forwardly from the back wall of and within the casing, a nut within the casing and held non-rotatably by said fingers and between the same and the back wall of the casing and against said wall, a locking member in the form of a bolt having a head and extending forwardly through and bearing with its head against the rear side of the license plate and also through and in threaded relation with said nut, and provided near its front end with an annular groove providing a cylindrical neck and at its front end with a spear point of greater diameter at its rear end than said neck to provide an abrupt rearwardly-facing shoulder at the front end of said neck, and a second locking member fastened to said element and including a pair of spring fingers within the casing and relatively converging forwardly and spaced from the rear side of said element, the free edges of the fingers having notches conjointly forming an opening snugly embracing the neck of said bolt and standing in the path of withdrawal movement of the said spear point.

STRAUD K. WOOD.